United States Patent
Bourne et al.

[15] 3,656,892
[45] Apr. 18, 1972

[54] METHOD OF PRODUCING SODA ASH

[72] Inventors: Douglas J. Bourne; Frank E. Lamb, both of Tucson, Ariz.

[73] Assignee: Duval Corporation, Houston, Tex.

[22] Filed: Sept. 19, 1969

[21] Appl. No.: 863,673

Related U.S. Application Data

[63] Continuation of Ser. No. 590,308, Oct. 28, 1966, abandoned.

[52] U.S. Cl. .................................................. 23/63, 23/302
[51] Int. Cl. ............................................................ C01d 7/12
[58] Field of Search ................... 23/64, 63, 121, 89, 184, 301, 23/302

[56] References Cited

UNITED STATES PATENTS

| | | | |
|---|---|---|---|
| 2,133,455 | 10/1938 | Keene et al. | 23/63 |
| 2,770,524 | 11/1956 | Seaton et al. | 23/63 |
| 3,103,413 | 9/1963 | Bluementhal | 23/63 |
| 3,189,408 | 6/1965 | Miller | 23/63 |
| 3,425,795 | 2/1969 | Howard et al. | 23/63 |
| 1,853,275 | 4/1932 | Houghton et al. | 23/40 |
| 2,028,898 | 1/1936 | VanderCook et al. | 23/184 |
| 2,034,999 | 3/1936 | Staib et al. | 23/121 |
| 2,046,717 | 5/1936 | Sweetland et al. | 23/184 |
| 2,863,809 | 12/1958 | Svanoe | 23/184 X |
| 3,321,268 | 5/1967 | Copson et al. | 23/63 |

Primary Examiner—Oscar R. Vertiz
Assistant Examiner—G. O. Peters
Attorney—J. Vincent Martin, Joe E. Edwards and M. H. Gay

[57] ABSTRACT

This patent discloses a system for obtaining anhydrous sodium carbonate from crude sodium sesquicarbonate. The sesquicarbonate is calcined and impurities removed. The intermediate product, a solution of sodium carbonate, is evaporated under temperature conditions which result in growth of anhydrous sodium carbonate crystals. In the last stage of evaporation a co-solute of sodium hydroxide or sodium chloride is added to shift the phase boundary of sodium carbonate sufficiently to permit the last stage of crystallization to be carried out at atmospheric pressure while still growing crystals of anhydrous sodium carbonate. The preferred co-solute is sodium hydroxide and a system is shown for treating a bleed of the sodium hydroxide liquor from the last stage of evaporation to remove therefrom undesirable contaminants.

6 Claims, 4 Drawing Figures

Douglas J. Bourne
Frank E. Lamb
INVENTORS

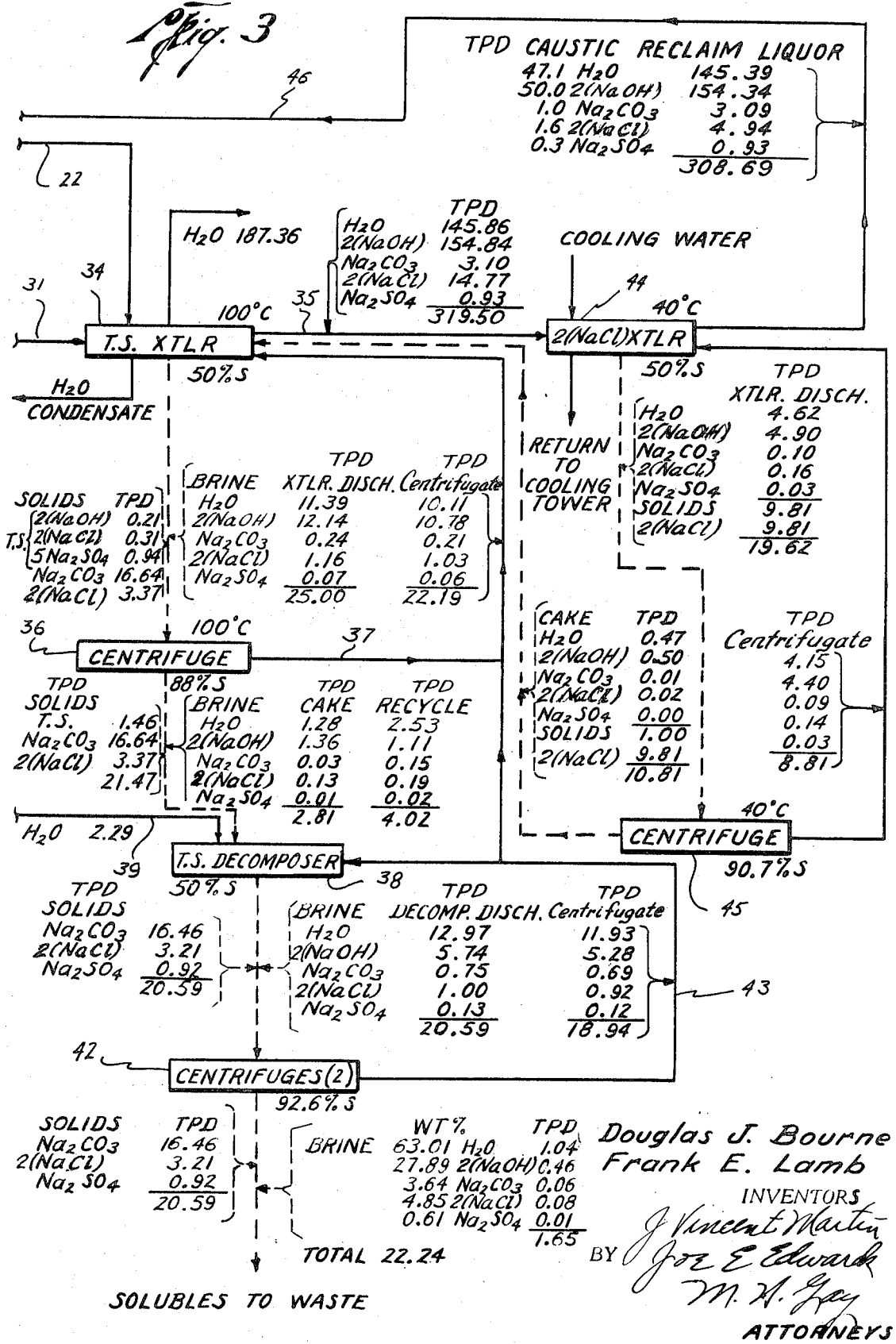

METHOD OF PRODUCING SODA ASH

This application is a continuation of application Ser. No. 590,308, filed Oct. 28, 1966, now abandoned.

This invention relates to the production of soda ash.

Soda ash finds a significant use in chemical and allied industries as for example in the production of glass. The density of the soda ash controls the amount which may be charged into a vessel in the glass-making process. Density is also a factor in the cost of transportation and storage. In view of these problems, the industry has always sought a denser soda ash.

In the past, the normal method used in the industry in the production of soda ash (anhydrous sodium carbonate) has been to crystallize sodium carbonate monohydrate from sodium carbonate-rich brine and subsequently remove the water in the adhering brine and the water of hydration by subjecting the crystals to thermal decomposition. As the water of hydration is removed, the soda ash crystal is fractured and its bulk density is relatively low.

It has been proposed in the patent to Lynn U.S. Pat. No. 1,907,987 to produce solid anhydrous sodium carbonate by crystallizing the carbonate from a water solution under pressure. See also the patent to Seaton U.S. Pat. No. 2,770,524. This system, to our knowledge, has never been used commercially, primarily because there is no known means of continuously removing the solids from a pressure system. It is known that the presence of sodium hydroxide or sodium chloride will shift the stable solid phase of a sodium carbonate solution to anhydrous sodium carbonate at atmospheric pressure and a temperature of approximately 109° C., or less. (Keene U.S. Pat. No. 2,133,455).

By this invention the problem of removing anhydrous sodium carbonate under pressure is solved by introducing sodium hydroxide or sodium chloride into the solution before the pressure is reduced to atmospheric.

This invention permits the use of multiple-effect evaporator-crystallizers with resulting economics by operating the last-stage crystallizer at atmospheric pressure and mixing the sodium carbonate solution and previously formed anhydrous sodium carbonate with sodium hydroxide or sodium chloride in the last-stage evaporator-crystallizer.

It is an object of this invention to provide a method of producing crystalline anhydrous soda ash in which soda ash formed under pressure is removed from the mother liquor at atmospheric pressure.

Another object is to provide an economic, practical way of producing anhydrous crystalline sodium carbonate of high density from a solution of sodium carbonate.

Another object is to provide a practical method of producing crystalline soda ash which has a higher bulk density than that obtained by thermal decomposition of hydrated crystals.

Another object is to provide a method of producing soda ash in which multiple-effect evaporator-crystallizers may be used to produce anhydrous sodium carbonate with the last evaporator-crystallizer operating at or below atmospheric pressure to facilitate separation of the crystals and liquor.

Another object is to provide a method of producing anhydrous crystalline sodium carbonate in which sodium hydroxide or sodium chloride is introduced into the liquor in the final evaporative stage to shift the stable solid phase of the system to anhydrous sodium carbonate.

Another object is to provide a method of removing sodium chloride and the triple salt sodium hydroxide-sodium chloride-sodium sulphate from a liquor containing sodium hydroxide to reclaim the liquor for use in soda ash production.

Another object is to provide a method of producing anhydrous crystalline sodium carbonate in which sodium hydroxide is introduced into the sodium carbonate solution in the final evaporative stage of a multiple stage system to shift the stable solid phase of the system to anhydrous sodium carbonate and in which the sodium hydroxide is reclaimed by removing therefrom sodium chloride and the triple salt sodium hydroxide-sodium chloride-sodium sulphate.

Another object is to provide a method of removing sodium chloride and sodium sulfate from the system by selective crystallization of sodium chloride and the triple salt sodium hydroxide-sodium chloride-sodium sulfate and subsequently decomposing the said triple salt forming solid phases sodium chloride and sodium sulfate and redissolving the sodium hydroxide, separating and discarding the undesired solid phase and returning the sodium hydroxide rich solution to the process.

Other objects, features and advantages of the invention are apparent from the specification, the claims and the drawings.

In the drawing, wherein an illustrative embodiment of this invention is shown,

Figure 1:
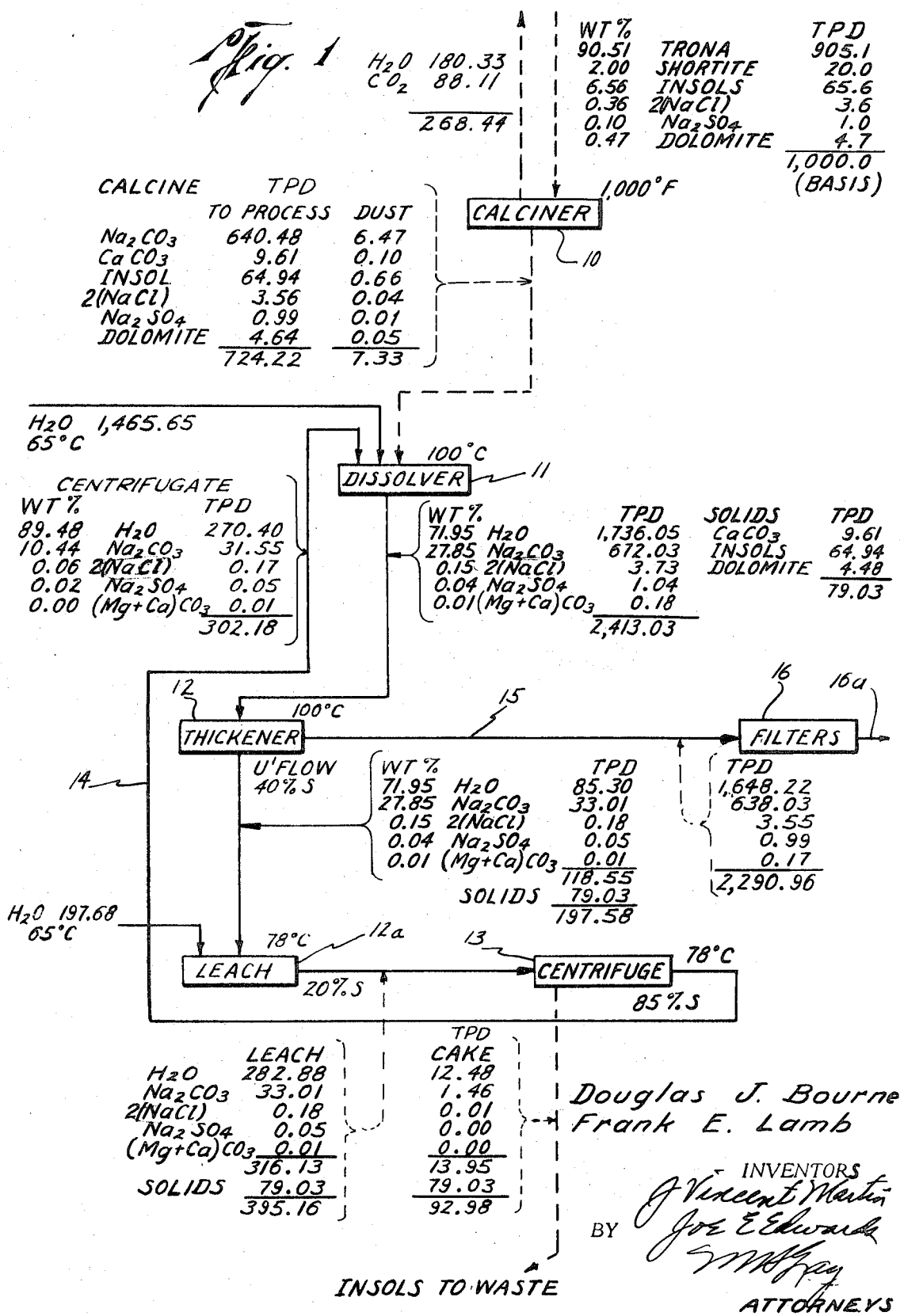
FIG. 1 is a flow sheet illustrating the calcining and insolubles removal portion of a plant.

A suitable source of crude sesquicarbonate, such as trona ore from Wyoming, is fed into the calciner 10 where it is subject to sufficient temperature to thermally decompose the ore and produce sodium carbonate.

The calcined ore contains insoluble and soluble impurities which must be removed to obtain the clear white sodium carbonate of high purity required by the glass industry. This is accomplished by dissolving the solubles in dissolver 11, separating out the insolubles and filtering the solution.

The solution and the insolubles from the dissolver 11 are fed to a thickener 12. The underflow from the thickener 12, containing about 20 to 50 percent solids, passes to leach tank 12A wherein any undissolved solubles are dissolved by water addition. The resulting slurry is directed to a centrifuge 13 where the centrifugate is removed and returned through line 14 to dissolver 11. The insolubles from the centrifuge are waste.

The solution from the thickener 12 passes through line 15 to filters 16 for a final filtration step. Preferably, the filters 16 include a pressure filter for more complete removal of insolubles, a charcoal filter for removing coloring impurities, and finally a polishing filter to produce a substantially pure sodium carbonate solution free of all but soluble impurities.

In accordance with this invention, multiple-effect evaporator-crystallizers may be utilized to crystallize anhydrous sodium carbonate. Multiple-effect evaporator-crystallizers will permit the boiloff steam from one crystallizer to be utilized as a driving force for another crystallizer.

Figure 2:
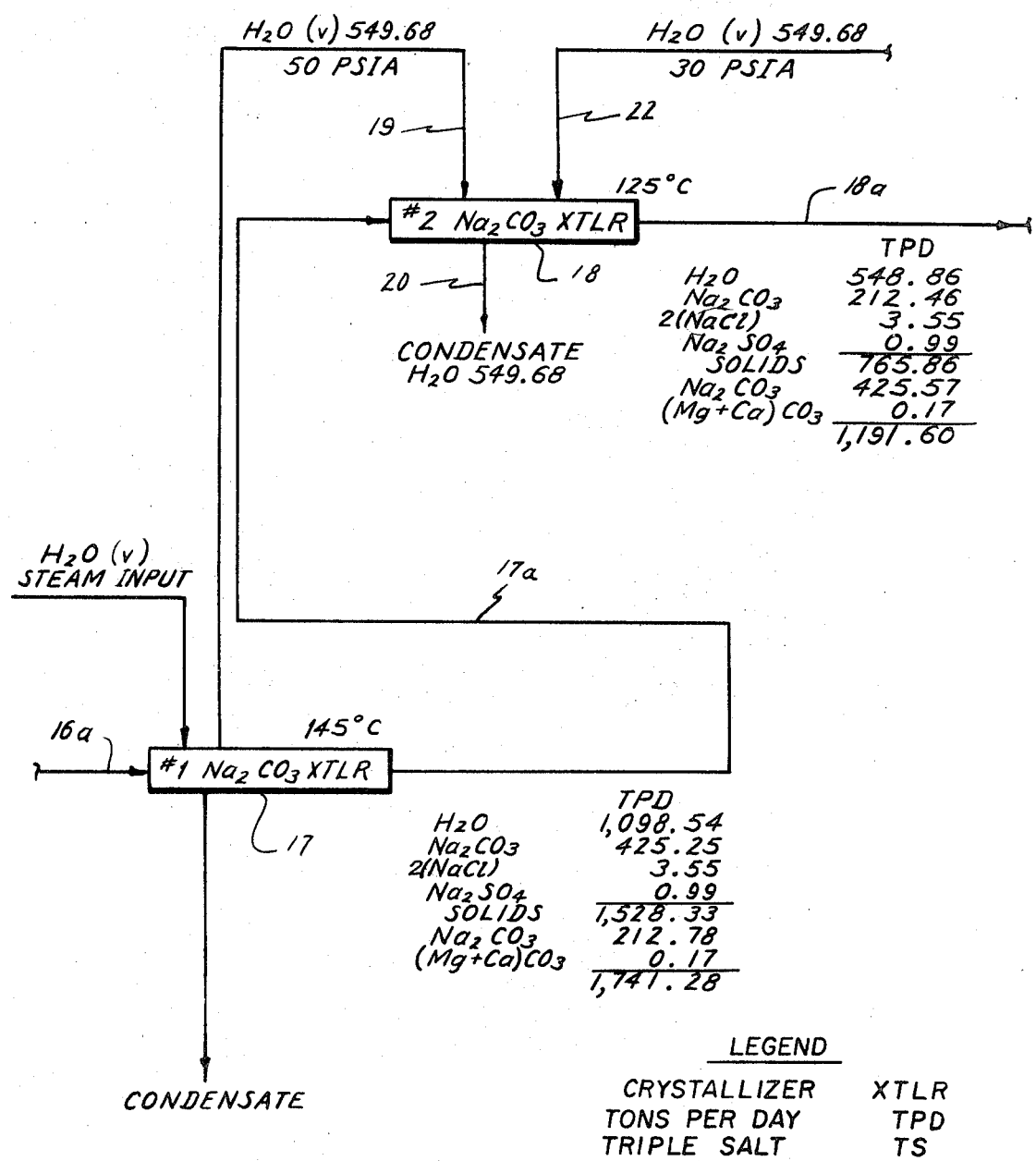
FIGS. 2 and 2A are a flow sheet illustrating the portion of the plant in which the anhydrous sodium carbonate is produced; and, FIG. 3 is a flow sheet illustrating the portion of the plant in which the sodium hydroxide solution is reclaimed and soluble impurities are rejected.
Figure 2A:
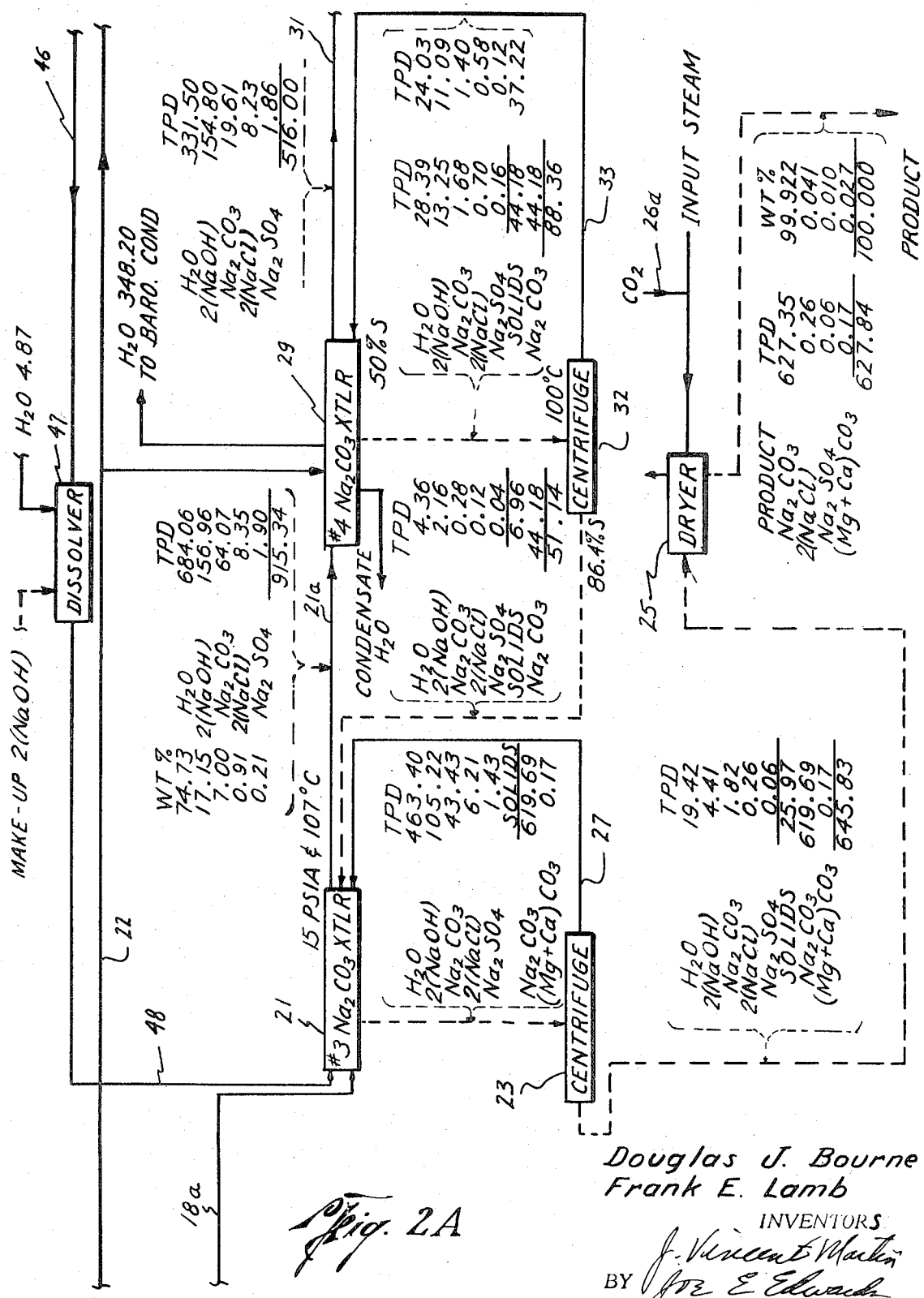

In accordance with this invention, the saturated solution of sodium carbonate is preferably fed through a plurality of multiple-effect crystallizers under pressure so that the stable solid phase of the system will be anhydrous sodium carbonate. From the filters 16, of FIG. 1, the saturated solution is fed through line 16a to a first crystallizer 17, of FIG. 2. Steam from a suitable source evaporates the desired amount of water and maintains an elevated temperature in the first crystallizer. For example, this temperature might be 145° C. A back pressure is maintained on the boiloff vapors from crystallizer 17 in any desired manner. Preferably, the back pressure maintained in line 19 which contains the water vapors boiled off in crystallizer 17 is about 50 psia. The crystals of anhydrous sodium carbonate and saturated solution from the first crystallizer 17 are continuously fed to a second crystallizer 18 through line 17a. This crystallizer will be maintained at a temperature of about 125° C. by the boiled off vapors from line 19. The condensate from the high-temperature water vapor in line 19 is taken off through line 20 and is ultimately used as makeup water for the dissolver 11. The condensate from the first crystallizer 17 could be returned to the boilers or it could join the condensate in line 20.

The crystals from the first crystallizer continue to grow and additional crystals are, of course, formed in crystallizer 18. The boiloff vapors from the second crystallizer pass through line 22 to crystallizers 29 and 34. The temperature in the second crystallizer is maintained at a high level by maintaining a suitable back pressure on line 22 such as 30 psia. This will result in operation of the second crystallizer at about 125° C.

Crystals grown in the second crystallizer, together with the saturated solution of sodium carbonate, are passed to the third crystallizer 21 through line 18a.

The third crystallizer is operated at atmospheric pressure which results in a temperature of around 107° C. The stable solid phase of a sodium carbonate liquor at below 107° to 109° C. is monohydrate sodium carbonate. Thus, if no precautions were taken, the anhydrous crystals would quickly become monohydrate crystals.

In accordance with this invention, a co-solute is mixed with the sodium carbonate crystals and solution substantially at or before the time of reduction of pressure to atmospheric. It has been found that merely adding the co-solute will result in crystallization of sodium carbonate. The co-solute could be either sodium hydroxide or sodium chloride. Either of these co-solutes will shift the stable solid phase of the system toward anhydrous sodium carbonate. The amount of sodium hydroxide or sodium chloride used may vary in accordance with the desired results. As the sodium hydroxide is corrosive, equipment life presents a problem, and for this reason the solution is desirably relatively weak in sodium hydroxide. A suitable solution may be approximately 17 percent sodium hydroxide by weight of solution. With this percentage, anhydrous sodium carbonate is the stable solid phase. (See Keene U.S. Pat. No. 2,133,455).

Sodium chloride may be used with equal success. Sodium chloride is, however, a contaminant, and therefore sodium hydroxide is preferred. As will be explained below, the sodium hydroxide is converted in the final stage of the process to sodium carbonate.

It will also be apparent that evaporation could be conducted in crystallizer 21 where now only outsalting by the addition of sodium hydroxide is indicated in the material balance. Evaporation could be continued until all feed constituents from filters 16 report to the product. However, the resulting anhydrous sodium carbonate product would be contaminated to a substantial degree by soluble impurities. Note the sodium chloride content of the slurry from crystallizer 29. Therefore, the preferred flow sheet, as indicated in the drawings, minimizes the contamination by soluble impurities by limiting the concentration of said impurities in the liquor.

If it is desired to evaporate in crystallizer 21, product impurities may be reduced by using as a centrifuge cake wash a portion of the essentially pure, dilute caustic make up scheduled for addition to crystallizer 21.

Mother liquor from crystallizer 21 is introduced through line 21a into the reclaim crystallizer 29 where the concentration of the sodium hydroxide is increased by removal of water. The limiting sodium hydroxide concentration in the step is controlled by the sodium chloride and sodium sulfate concentrations in the brine. The purpose of this step is to form solid phase anhydrous sodium carbonate, uncontaminated by co-crystallization of the undesirable chloride and sulfate salts. At about 30 percent sodium hydroxide concentration, the possible solid phases in this system are sodium carbonate, sodium chloride and sodium sulfate. Above this concentration of sodium hydroxide, the stable solid phases are sodium carbonate, sodium chloride and a triple salt, sodium hydroxide-sodium chloride-sodium sulfate. The solution is thus evaporated or concentrated as far as possible without encountering co-crystallization of any of the undesirable solids with the desired anhydrous sodium carbonate. The solid anhydrous sodium carbonate thus formed is fed to centrifuge 32 at approximately 50 percent solids where it is debrined. The centrifugate is returned to crystallizer 29 through line 33 and the solids with some adhering brine are returned to crystallizer 21. This crystallizer is operated at about 100° C. at slightly below atmospheric pressure.

A slurry of 50 percent solids is withdrawn from the third-stage crystallizer 21 and the mother liquor is removed in centrifuge 23 and returned through line 27 to crystallizer 21.

The anhydrous sodium carbonate with about 3 to 5 percent moisture passes from the centrifuge to the dryer 25. In the dryer 25, the moisture is removed and, in accordance with this invention, it is preferred that the sodium hydroxide adhering to the sodium carbonate be converted to sodium carbonate. This may be accomplished by drying the anhydrous sodium carbonate in the presence of carbon dioxide which will convert the sodium hydroxide to sodium carbonate. The carbon dioxide may be obtained from any suitable source and is introduced through line 26a into dryer 25.

Reference is now made to FIG. 3 wherein the sodium hydroxide reclaim circuit is shown. The mother liquor from crystallizer 29 is introduced into crystallizer 34 through line 31. The purpose of this crystallizer is to remove the bulk of the soluble contaminants sodium sulfate and sodium chloride by crystallizing out of solution sodium chloride and the triple salt consisting of sodium hydroxide, sodium chloride and sodium sulfate. The solubility of sodium carbonate is also reduced in this step, and some solid phase sodium carbonate is formed. The heat necessary to provide for evaporation of water to raise the concentration of sodium hydroxide to approximately 50 percent by weight in the liquor is obtained from vapors off crystallizer 18 and/or from external sources such as a boiler or steam generator. It is desirable to operate this unit at a high temperature to facilitate good growth of the triple salt crystals, but the temperature is limited to a value sufficiently low to permit operation of the unit at or slightly below atmospheric pressure for ease of effecting solids-liquid separation. The crystals thus formed in the unit are directed at approximately 50 percent solids to centrifuge 36 where they are debrined. The centrifugate (or liquor) separated from the crystals is returned to the crystallizer through line 37, and the solids are discharged into the triple salt decomposer 38. These solids are mixed with water from line 39 to provide a final liquor in which the triple salt is unstable. The solid sodium carbonate remains stable. Operationally, it is desirable that this liquor be as concentrated as possible with respect to sodium hydroxide to minimize recycling of the sodium chloride and sulfate components to crystallizer 34. Therefore, for the flow sheet we have shown a sodium hydroxide composition of 28 percent by weight, just slightly below triple salt stability. The triple salt in this decomposer goes into solution and the stable solid phases sodium chloride and sodium sulfate are formed. When these two solids are formed, as in a fluidized bed suspension, they tend to be hydraulically segregated along with the solid sodium carbonate and can be removed and centrifuged separately. In this manner, sodium sulfate and/or sodium chloride could be returned individually to crystallizer 34 if or as necessary to adjust the relative compositions of the solids formed therein. The solids are discharged to centrifuge 42 at approximately 50 percent solids, where they are debrined. A portion of the centrifugate is returned to decomposer 38 and the balance is returned to crystallizer 34 through line 43. The solids with some adhering brine are discharged to waste.

The sodium chloride solubility in the liquor off the triple salt crystallizer 34 is higher than that permissible to provide good product purity. This liquor is therefore introduced into crystallizer 44 through line 35 wherein it is cooled to a lower temperature as for example 40° C. to decrease the solubility of the sodium chloride causing the same to crystallize out of solution. The solid sodium chloride at approximately 50 percent solids is sent to centrifuge 45 where it is debrined. The centrifugate is returned to crystallizer 44, and the solids with some adhering brine may be disposed of in a number of ways. First, they could be discarded to waste directly; secondly, they could be returned to crystallizer 34, or thirdly, they could be introduced into decomposer 38. For the purpose of this flow sheet, we have shown this stream being returned to crystallizer 34 as the preferred method. This serves the desirable function of ensuring sodium chloride stability in crystallizer 34. The caustic reclaim liquor from crystallizer 44 passes through line 46 to dissolver 47 where it is mixed with makeup sodium hydroxide and water to obtain the desired concentration. The resulting 17 percent solution is introduced into the crystallizer 21 through line 48.

From the above description, it is apparent that all of the objects of this invention have been attained. The use of boiloff vapors from one crystallizer to heat another crystallizer results in lower utility cost. Of course, any number of crystallizers could be used as indicated by plant design.

As it is extremely difficult to separate and centrifuge solids under pressure, and the anhydrous sodium carbonate would immediately begin to take on water and form monohydrate sodium carbonate when the temperature of the solution drops below about 107° to 109° C., it will be appreciated that depressing of this phase boundary by adding the co-solvent permits the sodium carbonate to be separated from the mother liquor at atmospheric pressure as anhydrous sodium carbonate. By adding the co-solvent in the third crystallizer, which operates at atmospheric pressure, an additional crystallizer step can be carried out while maintaining the stable solid phase of the solution as anhydrous sodium carbonate.

The foregoing disclosure and description of the invention is illustrative and explanatory thereof, and various changes in the method may be made within the scope of the appended claims without departing from the spirit of the invention.

What is claimed is:

1. The method of producing dense soda ash comprising,
   calcining crude sodium sesquicarbonate to convert it to sodium carbonate,
   then mixing the calcined ore with water and dissolving the sodium carbonate and other soluble salts therein,
   then removing the undissolved solids and coloring material from the aqueous sodium carbonate,
   then evaporating water from the sodium carbonate solution while maintaining the solution under pressure and at a temperature at which the stable solid phase field of the solution is anhydrous sodium carbonate to crystallize anhydrous sodium carbonate,
   then adding a co-solute of sodium hydroxide to said solution in sufficient amount to maintain the stable solid phase field of the solution as anhydrous sodium carbonate at not more than atmospheric pressure and reducing the pressure on said solution to not more than atmospheric to crystallize additional sodium carbonate,
   separating said crystals from the mother liquor,
   drying said crystals,
   evaporating at least a portion of the mother liquor to as high a concentration of sodium hydroxide as is possible wherein the only stable solid phase is anhydrous sodium carbonate,
   separating the anhydrous sodium carbonate crystals thus formed from the mother liquor,
   further evaporating water from the mother liquor to raise the sodium hydroxide concentration to a value at which substantially all of the undesirable sodium sulfate has crystallized as the triple salt sodium hydroxide-sodium chloride-sodium sulfate and crystals of sodium chloride and sodium carbonate are formed,
   separating the said triple salt and sodium chloride and sodium carbonate solid phases from the mother liquor,
   cooling the said mother liquor to form additional solid phase sodium chloride,
   separating the solid phase sodium chloride from said mother liquor,
   and recycling said mother liquor to the co-solute addition step.

2. The method of producing dense soda ash comprising,
   calcining crude sodium sesquicarbonate to convert it to sodium carbonate,
   then mixing the calcined ore with water and dissolving the sodium carbonate and other soluble salts therein,
   then removing the undissolved solids and coloring material from the aqueous sodium carbonate,
   then evaporating water from the sodium carbonate solution while maintaining the solution under pressure and at a temperature at which the stable solid phase field of the solution is anhydrous sodium carbonate to crystallize anhydrous sodium carbonate,
   then adding a co-solute of sodium hydroxide to said solution in sufficient amount to maintain the stable solid phase field of the solution as anhydrous sodium carbonate at not more than atmospheric pressure and reducing the pressure on said solution to not more than atmospheric to crystallize additional sodium carbonate,
   separating said crystals from the mother liquor,
   drying said crystals,
   evaporating at least a portion of the mother liquor to as high a concentration of sodium hydroxide as is possible wherein the only stable solid phase is anhydrous sodium carbonate,
   separating the anhydrous sodium carbonate crystals thus formed from the mother liquor,
   further evaporating water from the mother liquor to raise the sodium hydroxide concentration to a value at which substantially all of the undesirable sodium sulfate has crystallized as the triple salt sodium hydroxide-sodium chloride-sodium sulfate and crystals of sodium chloride and sodium carbonate are formed,
   separating the said triple salt and sodium chloride and sodium carbonate solid phases from the mother liquor, cooling the said mother liquor to form additional solid phase sodium chloride, separating the solid phase sodium chloride from said mother liquor and recycling said mother liquor to the co-solute addition step,
   decomposing said separated triple salt in the presence of solid sodium carbonate by adding sufficient water to form solid phases of sodium chloride and sodium sulfate,
   separating said solid phases from resulting mother liquor,
   and returning said mother liquor to the triple salt crystallization step.

3. The method of removing sodium carbonate, sodium chloride and sodium sulfate from a liquor containing sodium hydroxide comprising,
   evaporating water from said solution to increase the concentration of sodium hydroxide therein to crystallize solid phase sodium carbonate, said evaporation being controlled to maintain the level of sodium hydroxide below that at which co-crystallization of chloride and sulfate containing solids is encountered,
   separating the solid phase sodium carbonate thus formed from the mother liquor,
   then evaporating water from said solution to raise the sodium hydroxide concentration to a level greater than 30 percent to crystallize the triple salt sodium hydroxide-sodium chloride-sodium sulfate, sodium chloride and sodium carbonate,
   separating the said triple salt, sodium chloride and sodium carbonate solids from the mother liquor,
   then cooling the mother liquor to further crystallize solid phase sodium chloride and obtain a relatively pure sodium hydroxide liquor,
   and separating the solid phase sodium chloride thus formed from the mother liquor.

4. The method of removing sodium carbonate, sodium chloride and sodium sulfate from a liquor containing sodium hydroxide comprising,
   evaporating water from said solution to increase the concentration of sodium hydroxide therein to crystallize solid phase sodium carbonate, said evaporation being controlled to maintain the level of sodium hydroxide below that at which co-crystallization of chloride and sulfate containing solids is encountered,
   separating the solid phase sodium carbonate thus formed from the mother liquor,
   then evaporating water from said solution to raise the sodium hydroxide concentration to a level greater than 30 percent to crystallize the triple salt sodium hydroxide-sodium chloride-sodium sulfate, sodium chloride and sodium carbonate, separating the said triple salt, sodium chloride and sodium carbonate solids from the mother liquor, then cooling the mother liquor to further crystallize solid phase sodium chloride and obtain a relatively pure sodium hydroxide liquor, separating the solid phase sodium chloride thus formed from the mother liquor, decomposing said triple salt by adding water thereto to form solid phase sodium chloride and sodium sulfate, separating the solids from the mother liquor and returning the mother liquor to the triple salt crystallization step.

5. The method of producing dense soda ash comprising, calcining crude sodium sesquicarbonate to convert it to sodium carbonate, then mixing the calcined ore with water and dissolving the sodium carbonate and other soluble salts therein, then removing the undissolved solids and coloring material from the aqueous sodium carbonate, then evaporating water from the sodium carbonate solution while maintaining the solution under pressure and at a temperature at which the stable solid phase field of the solution is anhydrous sodium carbonate to crystallize anhydrous sodium carbonate, then adding a co-solute selected from the group consisting of sodium hydroxide and sodium chloride to said solution in sufficient amount to maintain the stable solid phase field of the solution as anhydrous sodium carbonate at not more than atmospheric pressure and reducing the pressure on said solution to not more than atmospheric to crystallize additional anhydrous sodium carbonate, separating said crystals from the mother liquor, drying said crystals, further evaporating water from the mother liquor to crystallize anhydrous sodium carbonate, and separating said last formed crystals from the mother liquor and returning said last formed crystals to the co-solute addition step.

6. The method of removing sodium carbonate, sodium chloride and sodium sulfate from a liquor containing sodium hydroxide comprising, evaporating water from said solution to increase the concentration of sodium hydroxide therein to crystallize solid phase sodium carbonate, said evaporation being controlled to maintain the level of sodium hydroxide below that at which co-crystallization of chloride and sulfate containing solids is encountered, separating the solid phase sodium carbonate thus formed from the mother liquor, then evaporating water from said solution to raise the sodium hydroxide concentration to a level greater than 30 percent to crystallize the triple salt sodium hydroxide-sodium chloride-sodium sulfate, sodium chloride and sodium carbonate, separating the said triple salt, sodium chloride and sodium carbonate solids from the mother liquor, decomposing said triple salt by adding water thereto to form solid phase sodium chloride and sodium sulfate, separating the solids from the mother liquor and returning a portion of the mother liquor to the triple salt crystallization step.

* * * * *